United States Patent
Butler et al.

(10) Patent No.: US 12,554,738 B2
(45) Date of Patent: Feb. 17, 2026

(54) METHOD FOR DATA AND METADATA CORRELATION

(71) Applicant: T-Mobile Innovations LLC, Overland Park, KS (US)

(72) Inventors: Robert Keith Butler, Overland Park, KS (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 22 days.

(21) Appl. No.: 18/518,316

(22) Filed: Nov. 22, 2023

(65) Prior Publication Data

US 2025/0165494 A1     May 22, 2025

(51) Int. Cl.
*G06F 16/00*     (2019.01)
*G06F 16/25*     (2019.01)
*G06K 7/10*     (2006.01)

(52) U.S. Cl.
CPC ....... *G06F 16/258* (2019.01); *G06K 7/10297* (2013.01)

(58) Field of Classification Search
None
See application file for complete search history.

(56) References Cited

U.S. PATENT DOCUMENTS

| | | | | |
|---|---|---|---|---|
| 5,339,392 A | * | 8/1994 | Risberg | H04L 67/14 715/255 |
| 7,375,636 B1 | * | 5/2008 | Martin | G01R 31/2822 340/505 |
| 9,245,240 B2 | * | 1/2016 | Bannister | G06Q 30/02 |
| 10,664,903 B1 | * | 5/2020 | Haitani | G02B 27/017 |
| 2007/0187266 A1 | * | 8/2007 | Porter | B42F 7/025 206/459.5 |
| 2010/0052854 A1 | * | 3/2010 | Jeun | G06F 21/35 340/5.85 |
| 2010/0164687 A1 | * | 7/2010 | Perng | G06K 7/0008 340/10.1 |
| 2018/0121773 A1 | * | 5/2018 | Tercsinecz | G06K 19/0702 |
| 2018/0143961 A1 | * | 5/2018 | Thomas | H04L 67/10 |
| 2020/0034583 A1 | * | 1/2020 | Nikitin | G06K 7/10128 |
| 2025/0165494 A1 | * | 5/2025 | Butler | G06K 7/10297 |

FOREIGN PATENT DOCUMENTS

JP     2018505422 A   *   2/2018   ............. G06Q 10/06

* cited by examiner

*Primary Examiner* — Hasanul Mobin

(57) ABSTRACT

A method is disclosed for providing, in a server computer, a data set to a subscriber. The method includes receiving a first subscription request from a subscriber specifying first data content and format for members of a first data set, sending a second subscription request to a data set provider specifying a second data content and format for members of a second data set, receiving RFID reader locations, receiving a second data set member having RFID tag data read by the RFID readers, generating an object location based on the RFID tag data read and the RFID reader locations, receiving real-time data relating to the object; converting the real-time data to converted real-time data having the first data set data format; generating a first data set member from the object location, the tag data, and the converted real-time data, and sending the first data set member to the subscriber.

20 Claims, 6 Drawing Sheets

METHOD FOR DATA AND METADATA CORRELATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A large amount of data may be available concerning the presence, precise location, condition, and suitability for use of an item. Data sources such as RFID readers, video cameras, optical scanners, and scales may provide information about an item and/or collections of items. Data sources such as sensors for temperature, vibration, pressure, and humidity may provide information about the environment surrounding an item and/or collections of items.

SUMMARY

In an embodiment, a method is disclosed for providing, in a server computer, a data set to a subscriber, where the subscriber specifies a data content and a data format of data set members of the data set. The method comprises receiving, from a subscriber, a first subscription request comprising first data set information specifying a first data content and a first data format for first data set members of a first data set; sending, to a data set provider, a second subscription request comprising second data set information specifying a second data content and a second data format for second data set members of a second data set; receiving a plurality of reader locations relating to a corresponding plurality of radio frequency identification (RFID) readers; receiving, from the data set provider, a second data set member, the second data set member comprising a plurality of tag data from the plurality of RFID readers, where each tag data of the plurality of tag data is read by a corresponding RFID reader from a single RFID tag attached to an object; generating an object location based on the plurality of tag data and the plurality of reader locations; receiving real-time data from a data source, the real-time data relating to the object; converting the real-time data to converted real-time data having the data format specified by the first data set information; generating a first data set member from the object location, the tag data, and the converted real-time data, the first data set member comprising the data content and the data format specified by the first data set information; and sending the first data set member to the subscriber.

In another embodiment, a method is disclosed for providing, in a server computer, a data set to a subscriber, where the subscriber specifies a data content of data set members of the data set. The method comprises receiving, from a subscriber, a subscription request comprising data set information specifying a data content and a data format for data set members of a data set; receiving tag data from a radio frequency identification (RFID) reader, the tag data read from an RFID tag attached to an object; receiving real-time data from a data source, the real-time data relating to the object; converting the real-time data to converted real-time data having the data format specified by the data set information; generating a data set member by correlating the tag data and the converted real-time data, the data set member comprising the data content and the data format specified by the data set information; and sending the data set member to the subscriber.

In yet another embodiment, a method for providing, in a server computer, information to an external device is provided. The method comprises receiving, from an external device, data set information specifying a data content and a data format; sending, to a data set provider, a subscription request comprising the data set information for members of a data set; receiving, from the data set provider, a data set member comprising the data content and the data format specified by the data set information; generating extracted data from the data set member based on the data set information; and sending the extracted data to the external device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
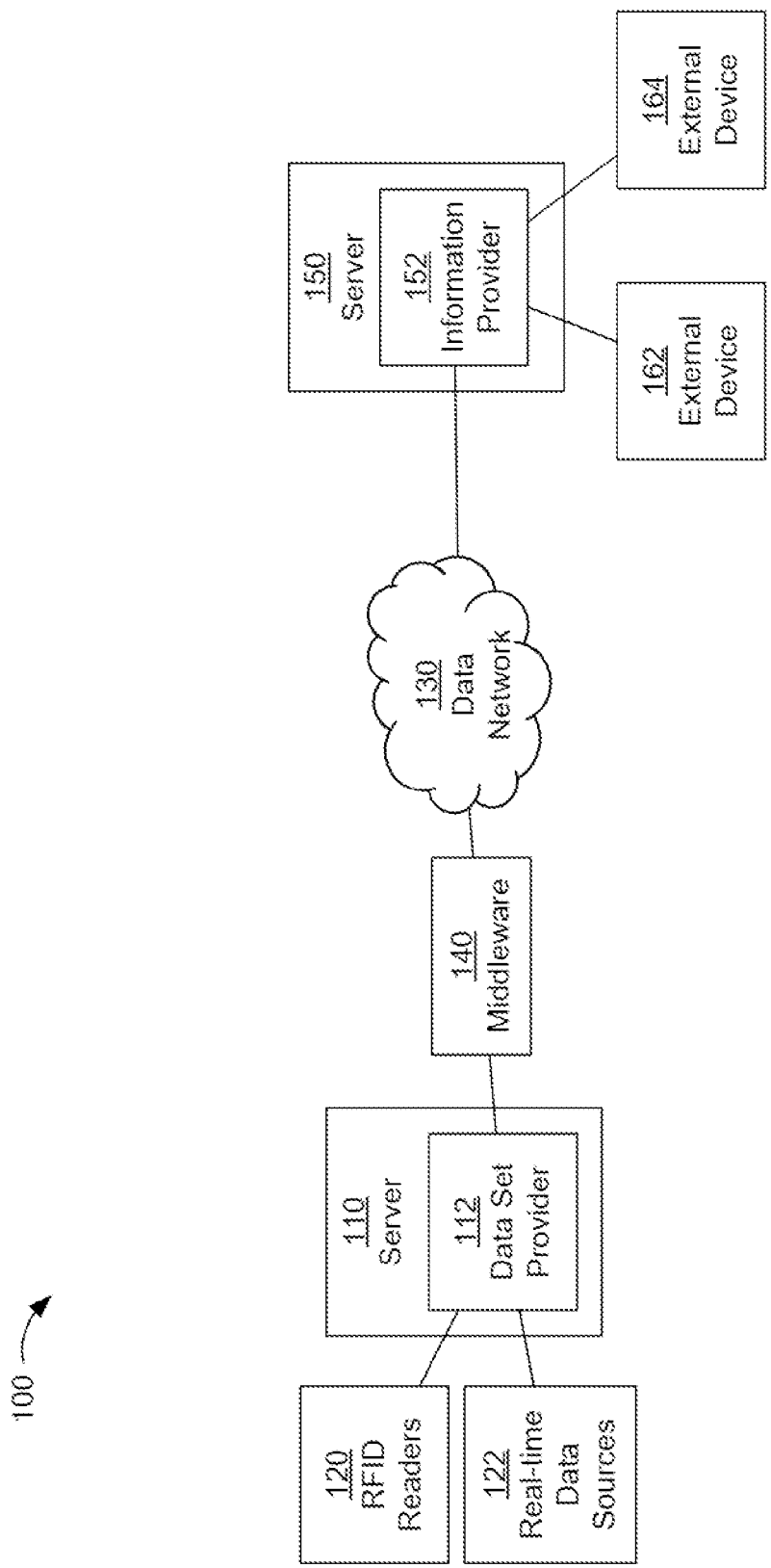
FIG. 1 is a block diagram of a first communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An increasingly large amount of data concerning an object's presence, precise location, condition, and suitability for use may be collected by a suite of sensors and readers, radio frequency identification (RFID) readers, video cameras, optical scanners, scales, and other such devices may provide information about objects and collections of objects. Environmental sensors such as temperature, vibration, pressure, and humidity, etc., provide information about an item's environment. Moving all such collected data to one or more data consumer locations may necessitate higher bandwidth communication links than would otherwise be needed, or be otherwise unnecessary, wasteful, or expensive.

Methods according to the disclosure solve such problems by correlating data containing information about multiple items and coming from multiple sources. The methods enable data consumers to subscribe to and obtain information about only their items of interest and only their data of interest. The methods provide an efficient way to aggregate and send useful data, rather than all collected data. The methods provide traceability of where data and derived information originated. The methods provide efficient procedures to process, transport, disseminate, and store data.

Methods according to the disclosure solve such problems by reducing collected data to include only data requested by applications using the data, as well as by correlating collected data relating to specific items in correlations requested by applications using the data. Such reduction and correlation are performed at locations near the site of data collection, before sending the lesser amount of data to the applications using the data, which are often remote from the data collection site(s).

In a first example of use, a parking lot operator issues RFID tags to paying customers. Parking cost for each use of the parking lot varies based on factors such as whether the vehicle is in uncovered or covered parking space, the proximity of the space to an exit, and other factors. When a customer parks, RFID readers provides RFID tag information to a remote system, which confirms account status and parking rights. Video processing identifies the vehicle (based on location, license plate, make/model, etc.) and an image(s) is selected, cropped, and stored. Metadata is added to RFID data, such as the read event(s), video timestamp(s), the license plate, and is sent to a billing system. While the car is parked, new RFID tag data is acquired periodically. When the vehicle leaves, video processing and other metadata are gathered again, similarly to when the vehicle arrived. When video processing detects a car that does not have an RFID tag, a tow service may be called. Using methods according to the disclosure, data is processed, stored, and processed at a remote location and the cost of moving data from the parking facility is minimized.

In a second example of use, a company operates manufacturing plants and warehouses where sensitive goods are produced and stored awaiting delivery. Environmental conditions are important to the quality of the goods, and sensors collect temperature, pressure, and vibration data. As a part of the company's quality assurance process, access to data from RFID tag readers and sensors from various locations is provided using methods according to the disclosure when the goods are transferred to the customer. Such data may be entered into a hyperledger as proof of performance, perhaps to prompt payment to the company under a microcontract.

In a third example, a company's products are picked up by customers and delivery drivers at the company's facilities. The company has deployed RFID readers that regularly scan their facilities. Such readers may be in fixed positions, in handheld devices carried by employees, or mounted on forklifts, dollies, or other devices for moving products. Handheld device readers may read RFID tag data when triggered by a user. Forklift readers may read RFID tag data when the forklift engages with products or pallets. When mobile RFID readers read RFID tag data, they may also signal for collection of real-time data relating to the RFID tagged products. For each tag identified, the RFID reader collects a large amount of data that is filtered to retain meaningful data and reduce transport costs of transmitted data. The data is sent to a location where an algorithm uses RFID data and metadata from multiple readers over time to accurately calculate the location of packages. Using methods according to the disclosure, when a package is requested the accurate package location is known.

Using methods according to the disclosure, data and metadata from RFID readers, sensors, cameras, and other data sources is aggregated onsite into data sets by provider software. Such data sets are made available to subscribers, in some applications via middleware software. The structure of the data sets enables relevant data to be combined, marked, and efficiently transported. Data that is time sensitive may be marked as such. For example, data that was or may be used to establish a precise item location may be marked. Data (or data sets) with a specific marking may be subscribed to by subscriber software. The subscriber software uses and/or stores received data set members of data sets. Middleware software may provide access to data sets collected by multiple instances of provider software and may be used to efficiently distribute the data.

Methods according to the disclosure provide a data set data structure that supports storage of RFID data, data from other sources (such as sensors and processed video), metadata concerning the data (such as timestamps), metadata relating to devices that are producing data, processing that has already been done on the data, and processing that is to be done on the data. Such methods, when executed by a server computer, provide a computing engine to add metadata to RFID tag data and data from other sources, to use data associations to generate data sets for transport and storage, to create metadata from RFID data, devices producing data, and data processing software.

When executed by a subscriber server computer, such methods provide a computing engine to parse data members of data sets and to add data to a ledger acting as a source of truth using a decentralized application (dApp), a distributed blockchain application that operates via smart contracts. In this way, methods according to the disclosure result in improved computer system processing by automated posting of proof of performance for a facility handling the environmental maintenance and transferral of goods, thereby leading to payment to an owner of the facility for performance of contract.

Turning now to FIG. 1, a communication system 100 according to the disclosure is described. FIG. 1 is a block diagram of a first communication system 100 according to an embodiment of the disclosure. A server computer 110 executes an application referred to as a data set provider 112. The data set provider 112 is coupled to a plurality of RFID readers 120 and one or more real-time data sources 122. The data set provider 112 is communicatively coupled via middleware (software) 140 to a data network 130. Also coupled to the data network 130 is a server computer 150 executing an application referred to as an information provider 152. The information provider 152 is coupled to an external device 162 and an external device 164.

In various embodiments, the RFID readers 120 are stationary readers that receive responses from RFID tags in a zone of physical locations in a warehouse or other facility for handling objects. In various embodiments, the real-time data sources 122 include video cameras, optical scanners, environmental sensors such as temperature, humidity, or vibration sensors, or additional RFID readers that read the presence of RFID tags on objects other than the objects read by the RFID readers 120.

The data set provider 112 receives from, for example, the information provider 152 a subscription request that specifies a data content and a data format for members of a data set. The data set provider 112 receives tag data from an RFID reader 120 and real-time data from one or more real-time data sources 122, where the tag data and the real-time data relate to an object with an RFID tag. The tag data and the real-time data may include a timestamp, location, or other metadata, or the data set provider 112 may add such metadata to the tag data and/or the real-time data. The data set provider 112 converts the real-time data to converted real-time data having the data format specified in the subscription request for the members of the data set. Examples of the real-time data conversion may be extracting still images from a video feed, finding scans from an optical scanner that correspond to an object when it was in proximity to the optical scanner, or generating a historical record from temperature sensor data.

The data set provider 112 correlates the tag data and the converted real-time data to generate a data set member having the data content and the data format requested in the subscription request. The data set provider 112 sends the data set member to the information provider 152 via the middleware 140.

In some embodiments, the data set provider 112 and the information provider 152 communicate using a publish subscribe pattern, where the middleware 140 acts as a message broker. In other embodiments, the middleware 140 operates as Data Distribution Service (DDS) middleware, enabling the data set provider 112 and the information provider 152 to share meta-data about each other via IP multicast, subsequently using the meta-data to route messages to and from each other.

The information provider 152 receives from, for example, the external device 162 data set information that specifies a data content and a data format. The external device 162 may be executing, for example, customer software that monitors object inventory, or compliance with maintaining objects in a specified environment. The data set information may describe tag data that identifies tags of interest and/or real-time data of interest to the software of the external device 162. Customer software executing on the external device 164 (or other customer software executing on the external device 162) may send different data set information specifying different data content and data format to the information provider 152.

The information provider 152 sends to the data set provider 112 a subscription request specifying the data set information received from the external device 162. The information provider 152 subsequently receives from the data set provider 112 data set members comprising the data content and the data format specified by the data set information. The information provider 152 generates extracted data from the data set member and sends the extracted data to the external device 162.

In some embodiments, where the information provider 152 receives a plurality of data set information from one or both of the external device 162 and the external device 164, the information provider 152 may amalgamate the data set information and send a single subscription request to the data set provider 112. In other such embodiments, the information provider 152 may send individual subscription requests to the data set provider 112 for each data set information received from either of the external device 162 and the external device 164.

Coupled to the data network 130, the communication system 100 may include a plurality of servers and information providers similar to the server 150 and the information provider 152. The communication system 100 may further include a plurality of servers and data set providers similar to the server 110 and the data set provider 112, coupled to the network via middleware similar to the middleware 140.

Figure 2:
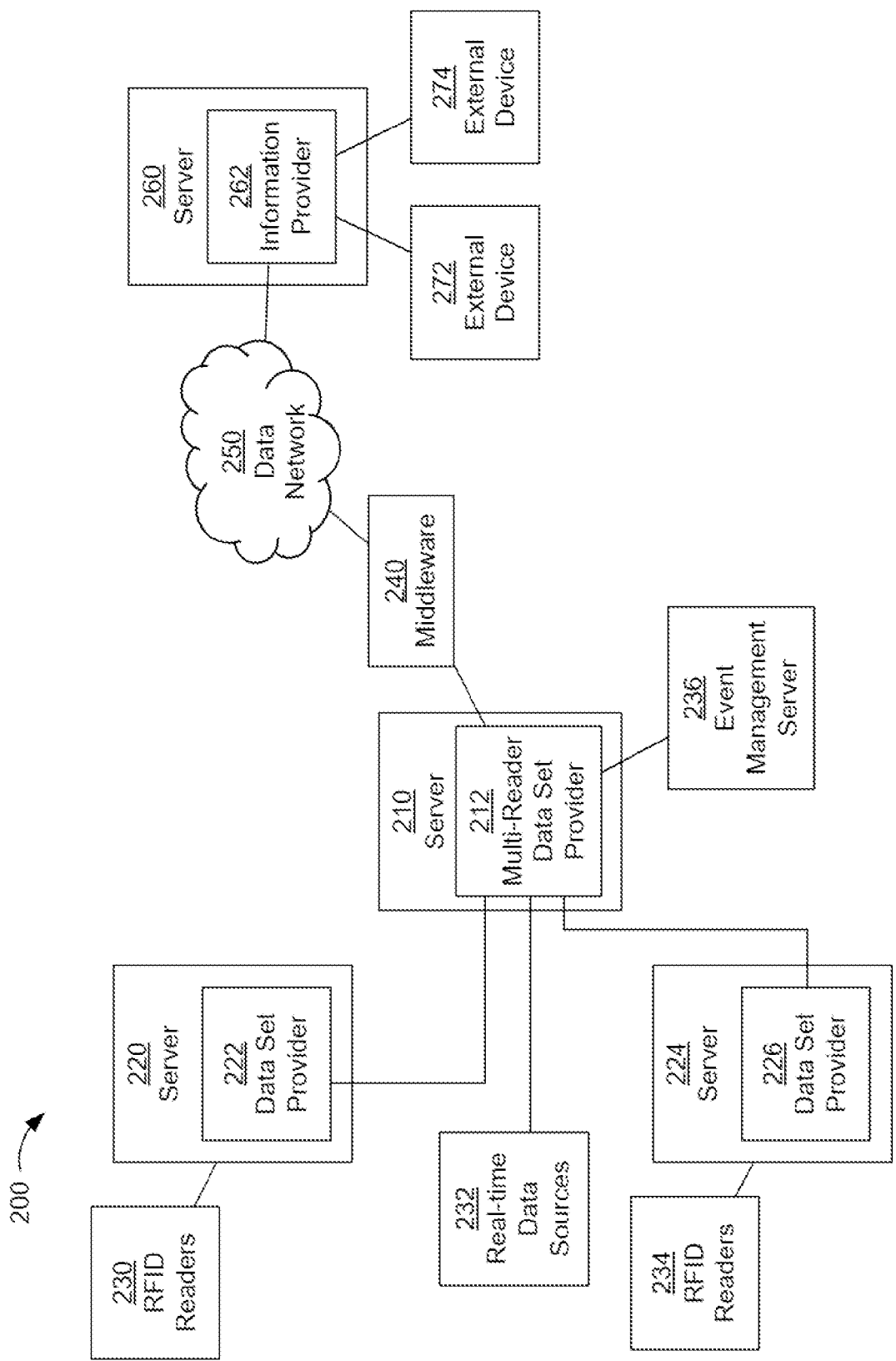
FIG. 2 is a block diagram of a second communication system according to an embodiment of the disclosure.

FIG. 2 is a block diagram of a second communication system 200 according to an embodiment of the disclosure. A server computer 220 executes an application referred to as a data set provider 222. The data set provider 222 is coupled to a plurality of RFID readers 230. A server computer 224 executes a data set provider 226. The data set provider 226 is coupled to a plurality of RFID readers 234. A server computer 210 executes an application referred to as a multi-reader data set provider 212. The multi-reader data set provider 212 is coupled to the data set providers 222 and 226, to one or more real-time data sources 232, and to an event management server 236. The multi-reader data set provider 212 is communicatively coupled via middleware (software) 240 to a data network 250. Also coupled to the data network 250 is a server computer 260 executing an application referred to as an information provider 262. The information provider 262 is coupled to an external device 272 and an external device 274.

As described above with reference to FIG. 1, in various embodiments, the middleware 140 acts as a message broker or as DDS middleware. Similarly, as described above, the external devices 272 and 274 may individually send one or more messages comprising data set information specifying a data content and a data format to the information provider 262. Customer software executing on the external devices 272 or 274 may send different data set information specifying different data content and data format to the information provider 262, which may amalgamate the data set information and send one or more subscription requests to the multi-reader data set provider 212.

In some embodiments of the communication system 200, the servers 220 and 224 are lower capacity, less expensive processors located close to their RFID readers 230 and 234, respectively. The data set providers 222 and 226 receive tag data, perform simple processing to correlate, for example, time stamp and/or reader location data with the tag data, and send the correlated data to the multi-reader data set provider 212. In some embodiments, the RFID readers 230 and 234 are located in different portions of a single conveyor belt, production area, or warehouse.

The server 210 may be a higher capacity processor that is centrally located within a facility. The multi-reader data set provider 212 may communicate with the data set providers 222 and 226 via a local network and with the middleware 240 via an external network.

The multi-reader data set provider 212 receives tag data and metadata from the data set providers, as well as real-time data from the real-time data sources 232. As described above with reference to the real-time data sources 122, the real-time data sources 232 may include video cameras, optical scanners, environmental sensors, or additional RFID readers. As described above with reference to the data set provider 112, the multi-reader data set provider 212 generates converted real-time data of a requested data format and correlates the tag data and the converted real-time data to generate a data set member having the requested data content and data format.

The multi-reader data set provider 212 performs weighting and/or selecting of information received from some readers over others. For example, a confidence metric may be calculated to estimate which RFID reader has the most reliable data (e.g., favoring an RFID reader that is closer to an object over others that are farther away). A more precise physical location of an object may be calculated from data received from multiple RFID readers. A weighting function may be used to estimate the most representative data relating to the physical environment of an object by, for example, weighting more heavily tag data and temperature real-time data from an RFID reader that is physically closest to the object than tag data and temperature data from more distant readers.

The multi-reader data set provider 212 may generate direction-of-motion information about an object based on information received from a plurality of RFID readers. The multi-reader data set provider 212 may report events from the facility to remote applications based on, for example, the physical location of an RFID-tagged object, image processed information from a still frame from a video camera, information received from an optical scanner, or an independent RFID reader sensing RFID tags on vehicles entering/exiting the facility. The criteria for such events may be specified by the event management server 236.

As described above with reference to the data set provider 112, multi-reader data set provider 212 receives from the information provider 262 a subscription request specifying a data content and a data format for members of a data set. The multi-reader data set provider 212 receives tag data from data set providers 222 and 226 and real-time data from the one or more real-time data sources 232, converts the real-time data to converted real-time data, and generates data set members according to the subscription request.

Figure 3:
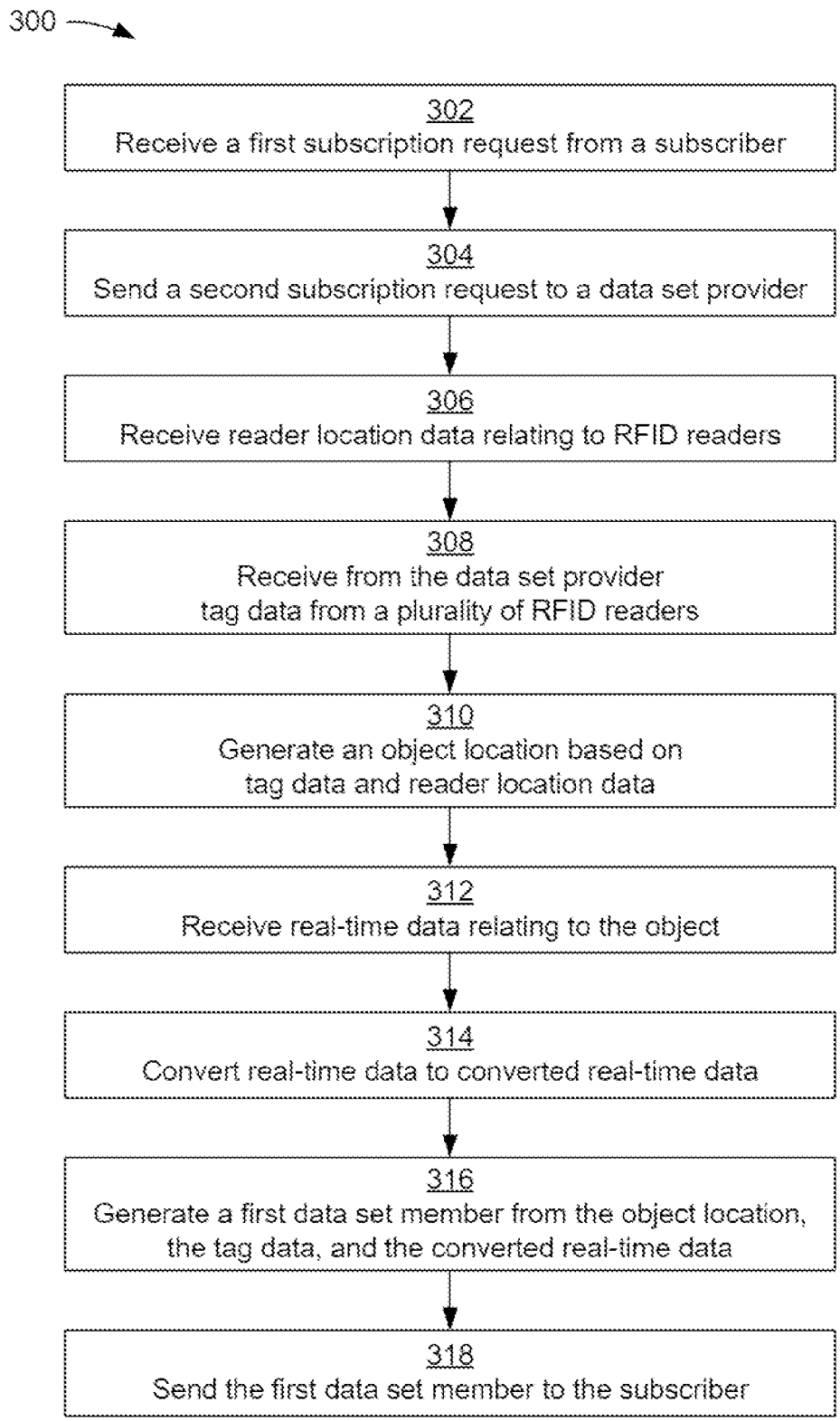
FIG. 3 is a flow chart of a first method according to an embodiment of the disclosure.

FIG. 3 is a flow chart of a first method 300 according to an embodiment of the disclosure. The method 300 is described as though performed within the system 200, but may be performed in other systems in other embodiments of the disclosure. In step 302, the multi-reader data set provider 212 receives from the information provider 262 a first subscription request that includes first data set information. The first data set information specifies a first data content and a first data format for first data set members of a first data set.

In step 304, the multi-reader data set provider 212 sends to at least one of the data set providers 222 and 226 a second subscription request that includes second data set information. The second data set information specifies a second data content and a second data format for second data set members of a second data set.

In step 306, the multi-reader data set provider 212 receives reader locations that relate to the locations of some or all of the RFID readers 230 and 234. The reader locations may be received from one or more of the RFID readers 230 and 234, the data set providers 222 and 226, and the event management server 236. The reader locations are based on physical locations (or zones) that are readable by each of the RFID readers 230 and 234. The zones that are readable by various RFID readers may overlap the zones of other RFID readers. In some embodiments, the reader location is based on real-time data, such as an image of the reader.

In step 308, the multi-reader data set provider 212 receives from the data set provider 222 or 226 a second data set member, which includes a plurality of tag data from the associated plurality of RFID readers 230 or 234. Each tag data of the plurality of tag data is read by a corresponding RFID reader from a single RFID tag attached to a single object. In step 310, the multi-reader data set provider 212 generates a location of the object (an object location), based on the plurality of tag data and the reader location data.

In step 312, the multi-reader data set provider 212 receives from the real-time data sources 232 real-time data that relates to the object whose tag data was received in step 310. In some embodiments, the real-time data includes product identifying information obtained by the real-time data source using image recognition. In various embodiments, the real-time data may be requested by the multi-reader data set provider 212 in response to the receipt of the tag data in step 308, may be received asynchronously from the real-time data source and stored by the multi-reader data set provider 212, or may be a historical record of real-time data collected by the real-time data source. In various embodiments, the real-time data sources 232 may additionally or alternatively be coupled to either or both of the data set providers 222 and/or 226. In such embodiments, the multi-reader data set provider 212 may receive the real-time data in the second data set member received in step 308. In step 314, the multi-reader data set provider 212 converts the received real-time data into converted real-time data that has the data format specified by the first data set information.

In step 316, the multi-reader data set provider 212 generates a first data set member from the object location, the tag data, and the converted real-time data. The first data set member includes the data content and the data format that are specified by the first data set information. In step 318, the multi-reader data set provider 212 sends the first data set member to the information provider 262.

Figure 4:
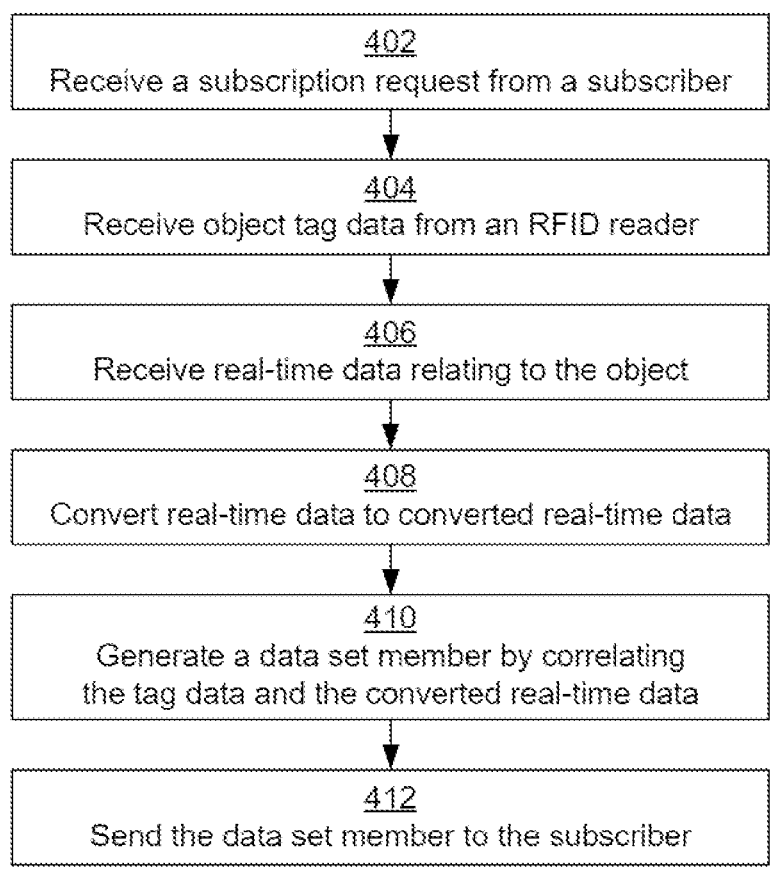
FIG. 4 is a flow chart of a second method according to an embodiment of the disclosure.

FIG. 4 is a flow chart of a second method 400 according to an embodiment of the disclosure. The method 400 is described as though performed within the system 100, but may be performed in other systems in other embodiments of the disclosure. In step 402, the data set provider 112 receives from a subscriber a subscription request comprising data set information that specifies a data content and a data format for data set members of a data set. The subscriber may be the information provider 152 or the middleware 140.

In step 404, the data set provider 112 receives tag data from one of the RFID readers, where the tag data is read from an RFID tag that is attached to an object. In step 406, the data set provider 112 receives real-time data from one or more of the real-time data sources 122, where the real-time data relates to the object.

In some embodiments, the real-time data is received asynchronously from the data source and stored by the data set provider 112. In some embodiments, the data set provider 112 sends a real-time data request to one or more of the real-time data sources 122 in response to receiving the tag data in step 404. In various embodiments, the real-time data comprises a historical record of real-time data collected by the data source, or product identifying information that is obtained by the real-time data source using image recognition. In some embodiments, the real-time data received by the data set provider 112 in step 406 includes a plurality of real-time data received from a corresponding plurality of data sources 122.

In step 408, the data set provider 112 converts the real-time data into converted real-time data that has the data format specified by the data set information. In some embodiments, the converted real-time data includes a subset of the real-time data received in step 406.

In step 410, the data set provider 112 generates a data set member by correlating the tag data received in step 404 and the converted real-time data of step 408, where the data set member comprises the data content and the data format specified by the data set information. In step 412, the data set provider 112 sends the generated data set member to the subscriber. In some embodiments, the data set includes a plurality of data set members and, in step 412, the data set provider 112 sends the plurality of data set members to the subscriber.

Figure 5:
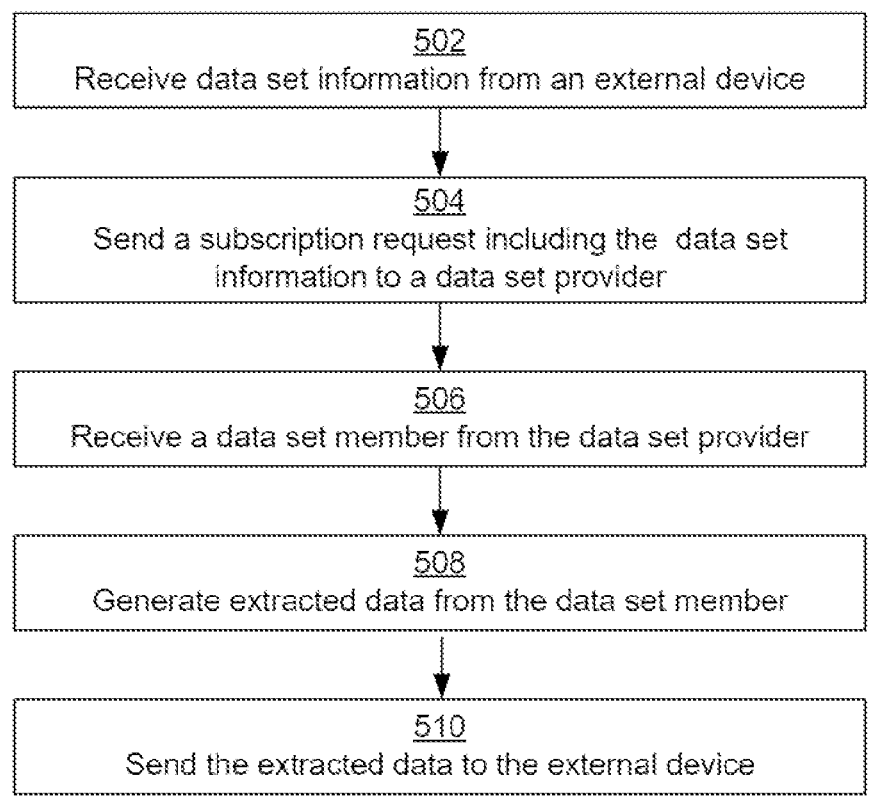
FIG. 5 is a flow chart of a third method according to an embodiment of the disclosure.

FIG. 5 is a flow chart of a third method 500 according to an embodiment of the disclosure. The method 500 is described as though performed within the system 100, but may be performed in other systems in other embodiments of the disclosure. In step 502, the information provider 152 receives data set information specifying a data content and a data format from the external device 162 or 164. In step 504, the information provider 152 sends to the data set provider 112 a subscription request that includes the data set information. In various embodiments, the subscription request may be sent via the middleware 140.

In step 506, the information provider 152 receives from the data set provider a data set member that includes the data content and the data format specified by the data set information. In step 508, the information provider 152 generates extracted data from the data set member received in step 506 and, in step 510, sends the extracted data to the external device 162 or 164 that sent the data set information received in step 502.

In some embodiments, a user of the external device 162 may be interested in certain data about the objects monitored by the data set provider 112, while a user of the external device 164 may be interested in other (perhaps overlapping) data about the objects. In such circumstances, the information provider 152 may receive a first data set information from the external device 162 and a second data set information from the external device 164.

In such embodiments, the subscription request sent to the data set provider 112 includes both the first and second data set information, which may represent a union of the data contents and the data formats requested by the external devices 162 and 164. Where a first subscription request was sent before receipt of the second data set information, the subscription request including both the first and second data set information may be referred to as an updated subscription request. In such situations, from the data set member received in step 506, the information provider 152 may generate, in step 508, first extracted data and second extracted data that are sent, in step 510, to the external device 162 and the external device 164, respectively.

Figure 6:
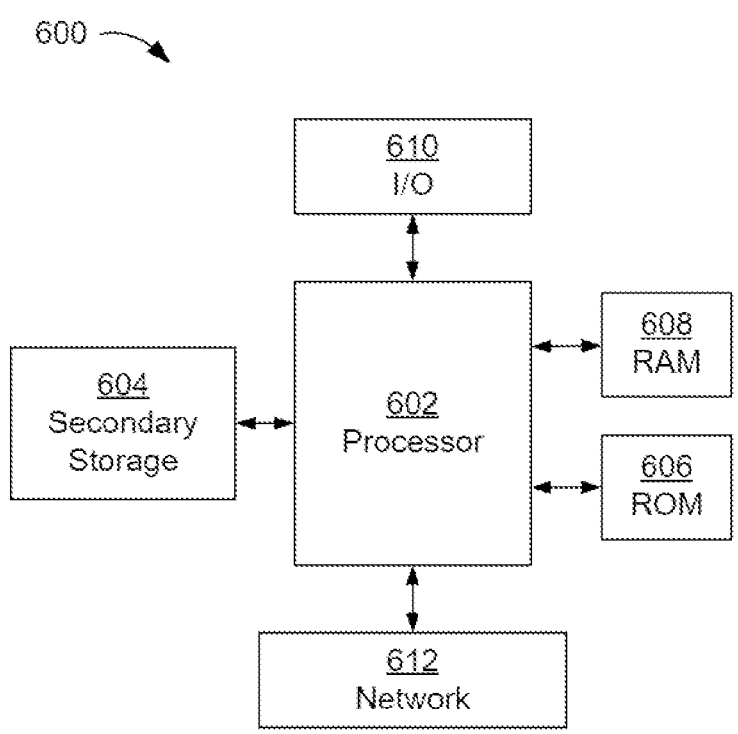
FIG. 6 is a block diagram of a hardware architecture of a device according to an embodiment of the disclosure.

FIG. 6 is a block diagram of a hardware architecture of a server computer 600 according to an embodiment of the disclosure. The server computer 600 may be suitable for implementing methods 300, 400 or 500. The server computer 600 includes a processor 602 (which may be referred to as a central processor unit or CPU) that is in communication with memory devices including secondary storage 604, ROM 606, and RAM 608. The processor 602 is also in communication with input/output (I/O) devices 610, and network connectivity devices 612. The processor 602 may be implemented as one or more CPU chips.

It is understood that by programming and/or loading executable instructions onto the server computer 600, at least one of the CPU 602, the RAM 608, and the ROM 606 are changed, transforming the server computer 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 602 may execute a computer program or application. For example, the CPU 602 may execute software or firmware stored in the ROM 606 or stored in the RAM 608. In some cases, on boot and/or when the application is initiated, the CPU 602 may copy the application or portions of the application from the secondary storage 604 to the RAM 608 or to memory space within the CPU 602 itself, and the CPU 602 may then execute instructions that the application is comprised of. During execution, an application may load instructions into the CPU 602, for example load some of the instructions of the application into a cache of the CPU 602. In some contexts, an application that is executed may be said to configure the CPU 602 to do something, e.g., to configure the CPU 602 to perform the function or functions promoted by the subject application. When the CPU 602 is configured in this way by the application, the CPU 602 becomes a specific purpose computer or a specific purpose machine.

The secondary storage 604 is used for non-volatile storage of data and as an over-flow data storage device if RAM 608 is not large enough to hold all working data. Secondary storage 604 may be used to store programs which are loaded into RAM 608 when such programs are selected for execution. The ROM 606 is used to store instructions and perhaps data which are read during program execution. ROM 606 is a non-volatile memory device which typically has a small memory capacity relative to the larger memory capacity of secondary storage 604. The RAM 608 is used to store volatile data and perhaps to store instructions. Access to both ROM 606 and RAM 608 may be faster than to secondary storage 604. The secondary storage 604, the RAM 608, and/or the ROM 606 may be referred to in some contexts as computer readable storage media and/or non-transitory computer readable media.

The processor 602 executes instructions, codes, computer programs, scripts which it accesses from the secondary storage 604, the ROM 606, or the RAM 608. While only one processor 602 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 604, the ROM 606, and/or the RAM 608 may be referred to in some contexts as non-transitory instructions and/or non-transitory information.

In some contexts, the secondary storage 604, the ROM 606, and the RAM 608 may be referred to as a non-transitory computer readable medium or a computer readable storage media. A dynamic RAM embodiment of the RAM 608, likewise, may be referred to as a non-transitory computer readable medium in that while the dynamic RAM receives electrical power and is operated in accordance with its design, for example during a period of time during which the server computer 600 is powered up and operational, the dynamic RAM stores information that is written to it. Similarly, the processor 602 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing, in a server computer, a data set to a subscriber, where the subscriber specifies a data content and a data format of data set members of the data set, the method comprising:
    receiving, from a subscriber, a first subscription request comprising first data set information specifying a first data content and a first data format for first data set members of a first data set;
    sending, to a data set provider in response to receiving the first subscription request from the subscriber, a second subscription request comprising second data set information specifying a second data content and a second data format for second data set members of a second data set;
    receiving a plurality of reader locations relating to a corresponding plurality of radio frequency identification (RFID) readers;
    receiving, from the data set provider, a second data set member, the second data set member comprising a plurality of tag data from the plurality of RFID readers, where each tag data of the plurality of tag data is read by a corresponding RFID reader from a single RFID tag attached to an object;
    generating an object location based on the plurality of tag data and the plurality of reader locations;
    receiving real-time data in a received data format from a data source, the real-time data relating to the object;
    converting the real-time data to converted real-time data having the first data format specified by the first data set information by transforming the real-time data with the received data format to the first data format to enable correlation with the tag data;
    generating a first data set member from the object location, the tag data, and the converted real-time data, the first data set member comprising the data content based on the object location, the tag data, and the converted real-time data in the data format specified by the first data set information carried in the first subscription request; and
    sending the first data set member to the subscriber.

2. The method of claim 1, wherein the reader location for an RFID reader is based on physical locations that are readable by the plurality of RFID readers.

3. The method of claim 2, wherein physical locations that are readable by a first of the plurality of RFID readers overlap physical locations that are readable by a second of the plurality of RFID readers.

4. The method of claim 1, wherein the reader location data for an RFID reader is further based on the real-time data.

5. The method of claim 1, wherein the second data set member comprises the real-time data.

6. The method of claim 1, wherein the real-time data is received asynchronously from the data source and stored in the server computer.

7. The method of claim 1, wherein the real-time data comprises a historical record of real-time data collected by the data source.

8. The method of claim 1, wherein the real-time data comprises product identifying information obtained by the data source using image recognition.

9. The method of claim 1, wherein the data source is a first data source of a plurality of data sources and the real-time data comprises a corresponding plurality of real-time data received from the plurality of data sources.

10. A method for providing, in a server computer, a data set to a subscriber, where the subscriber specifies a data content of data set members of the data set, the method comprising:
    receiving, from a subscriber, a subscription request comprising data set information specifying a data content and a data format for data set members of a data set;
    receiving tag data from a radio frequency identification (RFID) reader, the tag data read from an RFID tag attached to an object;
    receiving real-time data in a received data format from a data source, the real-time data relating to the object;
    converting the real-time data to converted real-time data having the data format specified by the data set information by transforming the real-time data with the received data format to the data format specified by the data set information to enable correlation with the tag data;
    generating a data set member by correlating the tag data and the converted real-time data, the data set member comprising the data content based on the tag data and the converted real-time data after correlation in the data format specified by the data set information carried in the subscription request; and
    sending the data set member to the subscriber.

11. The method of claim 10, wherein the converted real-time data comprises a subset of the real-time data.

12. The method of claim 10, wherein the real-time data is received asynchronously from the data source and stored in the server computer.

13. The method of claim 10, further comprising sending a real-time data request to the data source in response to receiving the tag data.

14. The method of claim 10, wherein the real-time data comprises a historical record of real-time data collected by the data source.

15. The method of claim 10, wherein the real-time data comprises product identifying information obtained by the data source using image recognition.

16. The method of claim 10, wherein the data source is a first data source of a plurality of data sources and the real-time data comprises a corresponding plurality of real-time data received from the plurality of data sources.

17. The method of claim 10, wherein the data set comprises a plurality of data set members and sending the data set member to the subscriber comprises sending the plurality of data set members to the subscriber.

18. A method for providing, in a server computer, information to an external device, the method comprising:
- receiving, from an external device, data set information specifying a data content and a data format;
- sending, to a data set provider in response to receiving the data set information, a subscription request comprising the data set information for members of a data set;
- receiving tag data from a radio frequency identification (RFID) reader, the tag data read from an RFID tag attached to an object;
- receiving real-time data in a received data format from a data source, the real-time data relating to the object;
- converting the real-time data to converted real-time data having the data format specified by the data set information by transforming the real-time data with the received data format to the data format specified by the data set information to enable correlation with the tag data;
- receiving, from the data set provider, a data set member by correlating the tag data and the converted real-time data, the data set member comprising the data content based on the tag data and the converted real-time data after correlation in the data format specified by the data set information;
- generating extracted data from the data set member based on the data set information; and
- sending the extracted data to the external device.

19. The method of claim 18, wherein the external device is a first external device and the data set information is a first data set information specifying a first data content and a first data format, the method further comprising:
- receiving, from a second external device, a second data set information specifying a second data content and a second data format; and
- sending, to the data set provider, an updated subscription request comprising the first data set information and the second data set information for the members of the data set.

20. The method of claim 19, wherein the extracted data is first extracted data, the method further comprising:
- generating second extracted data from the data set member based on the second data set information; and
- sending the second extracted data to the second external device.

* * * * *